US008505033B2

(12) United States Patent
Jonnagadla et al.

(10) Patent No.: US 8,505,033 B2
(45) Date of Patent: Aug. 6, 2013

(54) UNIVERSAL REGISTRATION IN BROKER-BASED MESSAGING SYSTEMS AND METHODS

(75) Inventors: Suresh S. Jonnagadla, Laurel, MD (US); Shailender Gola, North Potomac, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 309 days.

(21) Appl. No.: 12/869,384

(22) Filed: Aug. 26, 2010

(65) Prior Publication Data

US 2012/0054774 A1 Mar. 1, 2012

(51) Int. Cl.
*G06F 3/00* (2006.01)
*G06F 15/16* (2006.01)

(52) U.S. Cl.
USPC ............ 719/313; 719/315; 709/206; 709/227

(58) Field of Classification Search
None
See application file for complete search history.

(56) References Cited

U.S. PATENT DOCUMENTS

| | | | | |
|---|---|---|---|---|
| 7,516,178 | B1* | 4/2009 | DeFrang et al. | 709/227 |
| 8,191,078 | B1* | 5/2012 | Cullen et al. | 719/315 |
| 2003/0135556 | A1* | 7/2003 | Holdsworth | 709/206 |
| 2004/0236780 | A1* | 11/2004 | Blevins et al. | 707/102 |
| 2005/0021843 | A1* | 1/2005 | Duigenan et al. | 709/206 |
| 2005/0188039 | A1* | 8/2005 | Charters et al. | 709/206 |
| 2006/0190948 | A1* | 8/2006 | Burger et al. | 719/314 |
| 2008/0127209 | A1* | 5/2008 | Gale et al. | 719/313 |
| 2008/0134202 | A1* | 6/2008 | Craggs et al. | 719/313 |
| 2009/0019124 | A1* | 1/2009 | Reynolds et al. | 709/206 |
| 2009/0228563 | A1* | 9/2009 | Jones et al. | 709/206 |
| 2009/0238349 | A1* | 9/2009 | Pezzutti | 379/93.02 |

OTHER PUBLICATIONS

"WebSphere Business Integration Message Broker V5 Overview and Architecture", IBM, 2004, pp. 1-30.*
"Securing Publish/Subcribe for Multi-domain System", Jean Bacon, 2005, pp. 1-20.*
"WebMethods: Publish-Subscribe Developer's Guide", Software, 2007, pp. 1-236.*
"Extending WS-Notification with an Expressive Event Notification Broker", Labey, 2008, pp. 1-8.*

* cited by examiner

*Primary Examiner* — Tuan Dao

(57) ABSTRACT

An exemplary method includes a global directory service subsystem receiving a request for a software application to be temporarily registered with a message broker in accordance with a universal registration heuristic, authorizing, in response to the request and in accordance with permission information associated with the software application and maintained by the global directory service subsystem, the software application to be temporarily registered with the message broker; and dynamically updating, in response to the authorizing, software application registration data maintained by the global directory service subsystem to indicate that the software application is temporarily registered with the message broker. Corresponding methods and systems are also described.

23 Claims, 17 Drawing Sheets

600

Software Application Registration Table

| Software Application Name | Associated Broker Name | Registration Type |
|---|---|---|
| Application 1 | Broker A | Static |
| Application 2 | Broker D | Temporary |
| Application 3 | Broker A | Static |
| Application 4 | Broker A | Static |
| Application 5 | Broker C | Static |
| Application 6 | Broker B | Static |

Permissions Information Table

| Software Application Name | User ID |
|---|---|
| Application 2 | ABCD1234 |
| Application 7 | WXYZ9876 |

Broker Information Table

| Broker Name | Location IP Address | Location Port Number |
|---|---|---|
| Broker A | 111.191.221.65 | 7123 |
| Broker B | 155.159.211.39 | 4554 |
| Broker C | 122.125.135.145 | 3778 |
| Broker D | 165.167.169.19 | 3434 |

1200

Software Application Registration Table

| Software Application Name | Associated Broker Name | Registration Type |
|---|---|---|
| Application 1 | Broker A | Static |
| Application 3 | Broker A | Static |
| Application 4 | Broker A | Static |
| Application 5 | Broker C | Static |
| Application 6 | Broker B | Static |

Fig. 12

UNIVERSAL REGISTRATION IN BROKER-BASED MESSAGING SYSTEMS AND METHODS

BACKGROUND INFORMATION

Message-oriented middleware is infrastructure that increases the interoperability, portability, and flexibility of software applications by allowing the software applications to communicate one with another by transmitting messages therebetween. Message-oriented middleware reduces the complexity of developing software applications that span multiple operating systems and network protocols by insulating application developers from the details of the various operating system and network interfaces. Accordingly, software developers can more easily integrate new software applications with existing software applications.

In typical message-oriented middleware configurations, messages are transmitted from one software application to another by way of one or more message brokers. However, a message broker may occasionally fail or otherwise enter into a fault state in which it is unable to relay messages to and from software applications associated therewith. An inoperable message broker can cause undesirable delays, consume valuable network resources, and result in frustrating experiences for end users who rely on the software applications associated with the message broker.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 6 shows an exemplary software application registration table according to principles disclosed herein.

FIG. 8 shows an exemplary permissions information table according to principles disclosed herein.

FIGS. 11-16 show various implementations and examples of the system of FIG. 1 and method of FIG. 10 according to principles disclosed herein.

DETAILED DESCRIPTION OF PREFERRED EMBODIMENTS

Figure 1:
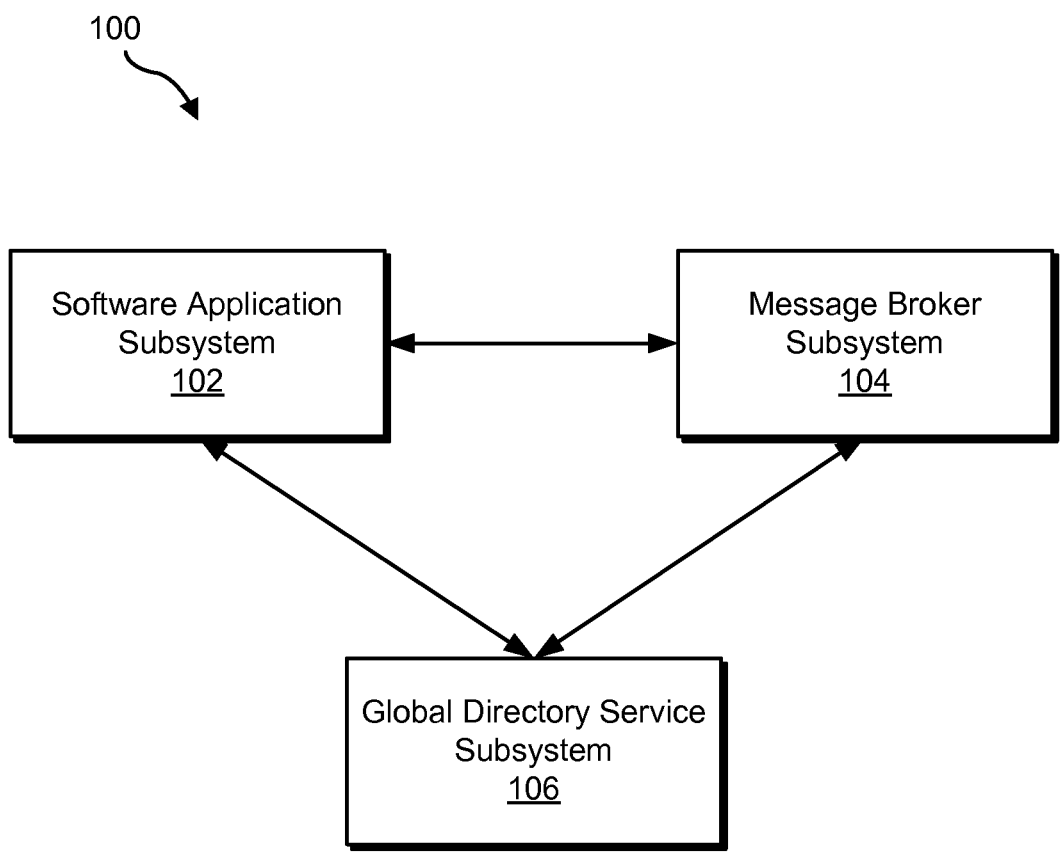
FIG. 1 illustrates an exemplary broker-based messaging system according to principles disclosed herein.

Exemplary methods and systems for universal registration in a broker-based messaging system are described herein. As described in more detail below, a global directory service subsystem may receive a request for a software application to be temporarily registered with a message broker in accordance with a universal registration heuristic. In response, the global directory service subsystem may authorize, in accordance with permission information associated with the software application and maintained by the global directory service subsystem, the software application to be temporarily registered with the message broker. The global directory service subsystem may then dynamically update, in response to the authorization, software application registration data maintained by the global directory service subsystem to indicate that the software application is temporarily registered with the message broker. In this manner, a software application may be selectively and temporarily registered with any one of a plurality of message brokers, which may result in a more efficient and effective broker-based messaging system.

As used herein, a software application "registered" with a message broker may be connected to the message broker and send and/or receive messages by way of the message broker. A software application "temporarily registered" with a message broker may be only connected to the message broker during a particular session. After the session has terminated, the software application can no longer send and/or receive messages by way of the message broker unless it re-registers with the message broker.

As used herein, the terms "universal registration heuristic" and "universal registration" will be used interchangeably to refer to any heuristic or option that allows a software application to be selectively and temporarily registered with any one of a plurality of message brokers. In contrast, a software application "statically" registered with a message broker is persistently associated with the message broker across multiple sessions and cannot be associated with any other message broker. Hence, a software application authorized to employ universal registration (i.e., operate in accordance with a universal registration heuristic) may, at run time, temporarily register with a particular message broker included in the plurality of message brokers and send and/or receive messages by way of the particular message broker during a particular session. After the session has terminated, the software application may again request to be selectively and temporarily registered with any one of the plurality of message brokers. In this manner, the software application is not forced to be associated with a single message broker at all times, thereby enhancing availability and reliability of the software application.

As used herein, the term "software application" may include, but is not limited to, a software product (e.g., a software program), a module within a software product, and/or any other software component (e.g. an enterprise java bean, a servlet, etc.) as may serve a particular implementation. As used herein, an "originating software application" is one that generates a message to be sent to another software application (referred to herein as a "recipient software application").

As used herein, a "message" generated by a software application may include any data that may be read or otherwise processed by a message broker and/or a recipient software application. A message may be transmitted in encrypted form, as cleartext (i.e., non-encrypted form), and/or in any other manner as may serve a particular implementation.

FIG. 1 illustrates an exemplary broker-based messaging system 100 (or simply "system 100"). As shown in FIG. 1, system 100 may include a software application subsystem 102, a message broker subsystem 104, and a global directory service subsystem 106 configured to communicate with one another. Software application subsystem 102 may be configured to maintain and/or execute a plurality of software applications, some of which may be functionally equivalent to one another. Message broker subsystem 104 may be configured to function as message-oriented middleware and facilitate delivery of one or more messages generated by one or more originating software applications to one or more recipient software applications. Global directory service subsystem 106 may be configured to maintain registration data associated with the software applications and message broker subsystem 104 so that message broker subsystem 104 may be able to determine how and where to deliver messages to the software applications. As will be described in more detail below, system 100 may facilitate temporary registration of a software application with any one of a plurality of message brokers in accordance with a universal registration heuristic.

Software application subsystem 102, message broker subsystem 104, and global directory service subsystem 106 may communicate using any communication platforms and technologies suitable for transporting data, including known communication technologies, devices, media, and protocols supportive of remote or local data communications. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Ethernet, and any other suitable communications technologies, devices, media, and protocols.

In some examples, software application subsystem 102, message broker subsystem 104, and global directory service subsystem 106 may communicate via one or more networks, including, but not limited to, wireless networks, broadband networks, closed media networks, cable networks, satellite networks, the Internet, intranets, local area networks, public networks, private networks, optical fiber networks, and/or any other networks capable of carrying data and communications signals between software application subsystem 102, message broker subsystem 104, and global directory service subsystem 106.

Figure 2:
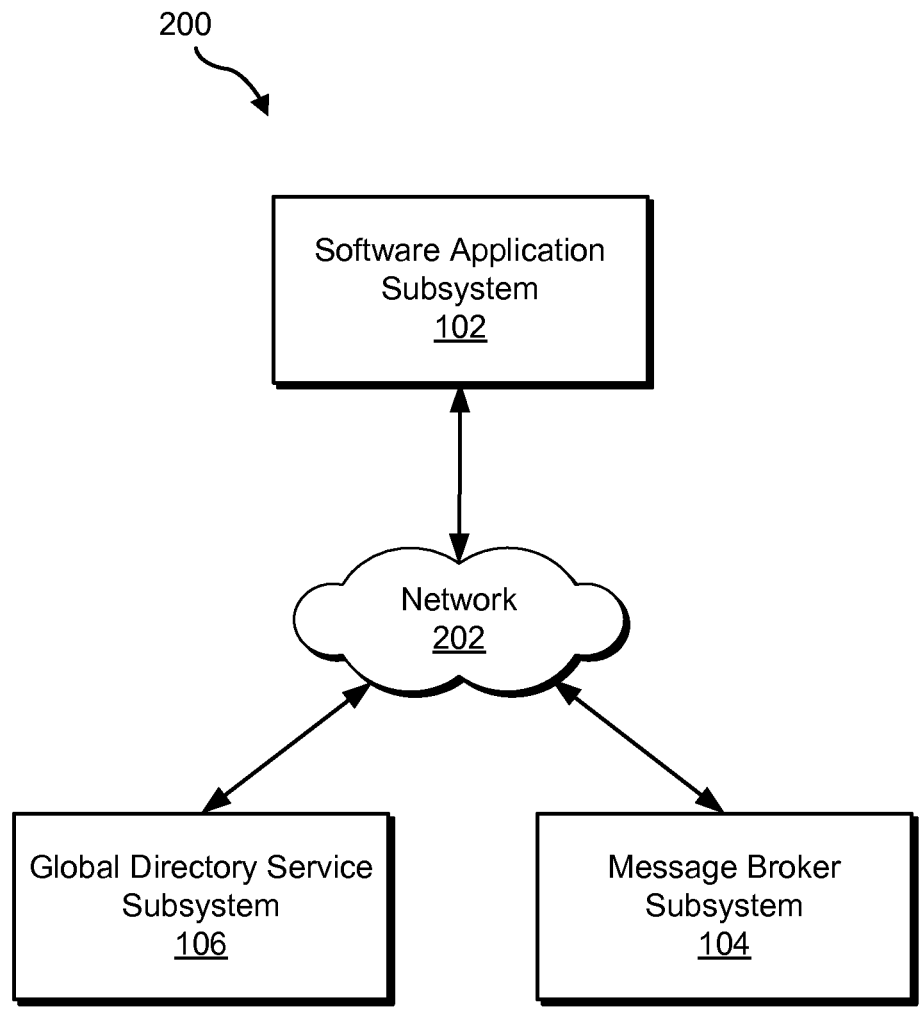
FIG. 2 illustrates an exemplary implementation of the system of FIG. 1 according to principles disclosed herein.

FIG. 2 shows an exemplary implementation 200 of system 100 wherein software application subsystem 102, message broker subsystem 104, and global directory service subsystem 106 are communicatively coupled via a network 202. Network 202 may include one or more networks, including, but not limited to, any of the networks listed above. Communications between software application subsystem 102, message broker subsystem 104, and global directory service subsystem 106 may be transported using any one of above-listed networks, or any combination or sub-combination of the above-listed networks. In some examples, software application subsystem 102, message broker subsystem 104, and/or global directory service subsystem 106 may be implemented at least in part by one or more servers or other network-enabled devices.

Software application subsystem 102, message broker subsystem 104, and global directory service subsystem 106 may each be implemented by one or more computing devices. For example, software application subsystem 102 may be implemented by a first computing device configured to execute an originating software application and a second computing device configured to execute a recipient software application. Alternatively, software application subsystem 102 may be implemented by a single computing device configured to execute both the originating and recipient software applications.

In some examples, software application subsystem 102, message broker subsystem 104, and global directory service subsystem 106 are implemented by distinct computing devices. Alternatively, subsystems 102-106 may be implemented by the same computing device. Any other implementation of subsystems 102-106 may be realized in accordance with the systems and methods described herein.

Figure 3:
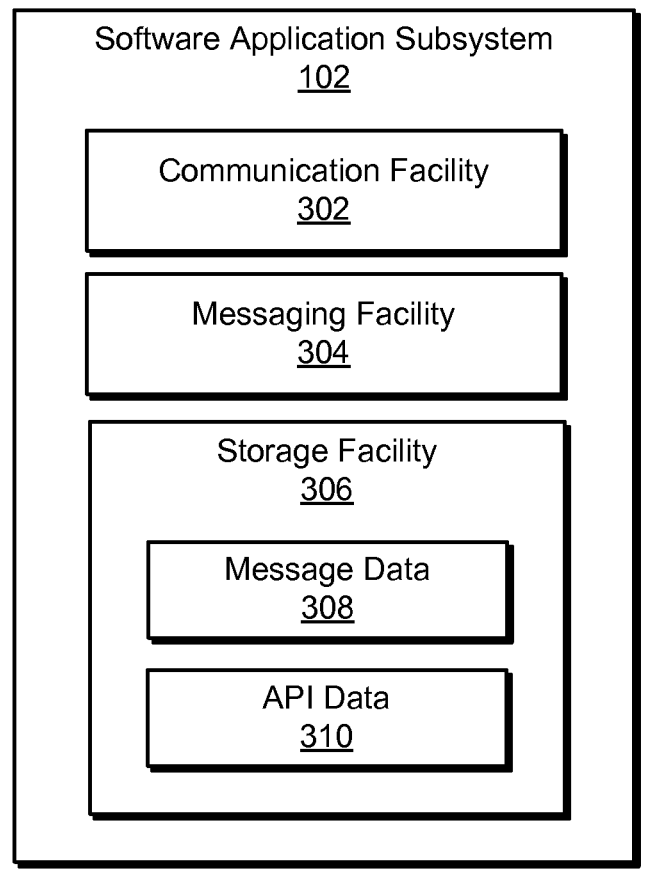
FIG. 3 illustrates exemplary components of a software application subsystem according to principles disclosed herein.

FIG. 3 illustrates exemplary components of software application subsystem 102. As shown in FIG. 3, software application subsystem 102 may include a communication facility 302, a messaging facility 304, and a storage facility 306, which may be in communication with one another using any suitable communication technologies.

Communication facility 302 may be configured to facilitate communication between software application subsystem 102 and message broker subsystem 104. For example, communication facility 302 may be configured to establish and/or assist in establishing one or more connections between software application subsystem 102 and message broker subsystem 104 over which one or more messages may be transmitted from software application subsystem 102 to message broker subsystem 104 and/or from message broker subsystem 104 to software application subsystem 102. The one or more connections established between software application subsystem 102 and message broker subsystem 104 may include one or more secure connections and/or one or more non-secure connection. An exemplary secure connection includes, but is not limited to, a secure sockets layer ("SSL") connection. An exemplary non-secure connection includes, but is not limited to, a non-SSL connection.

Communication facility 302 may additionally or alternatively be configured to facilitate communication between software application subsystem 102 and global directory service subsystem 106. For example, communication facility 302 may be configured to transmit a request to global directory service subsystem 106 for information indicative of one or more currently active message brokers. In this manner, a software application authorized to operate in accordance with a universal registration heuristic may connect to a message broker known to be currently active.

Messaging facility 304 may be configured to process a message generated by an originating software application and/or a message received by a recipient software application. Exemplary, but not exclusive, processing of a message that may be performed by messaging facility 304 includes encrypting a message, decrypting a message, preparing a message for transmission to a recipient software application via message broker subsystem 104, processing of a message received from message broker subsystem 104, etc.

Storage facility 306 may be configured to maintain message data 308 and application programming interface ("API") data 310. It will be recognized that storage facility 306 may maintain additional or alternative data as may serve a particular implementation.

Message data 308 may include data representative of one or more messages generated and/or received by a software application. Message data 308 may additionally include delivery instructions corresponding to one or more messages. For example, message data 308 may include an identifier (e.g., a name or identification number) of an intended recipient software application and/or computing device that executes the recipient software application.

API data 310 is representative of one or more APIs configured to facilitate integration of one or more software applications executed by software application subsystem 102 with message broker subsystem 104 and/or global directory service subsystem 106. For example, one or more APIs may interface with one or more software applications executed by application subsystem 102 to facilitate encryption of messages generated by the one or more software applications, communication with message broker subsystem 104 and/or global directory service subsystem 106, and/or any other feature as may serve a particular implementation.

Figure 4:
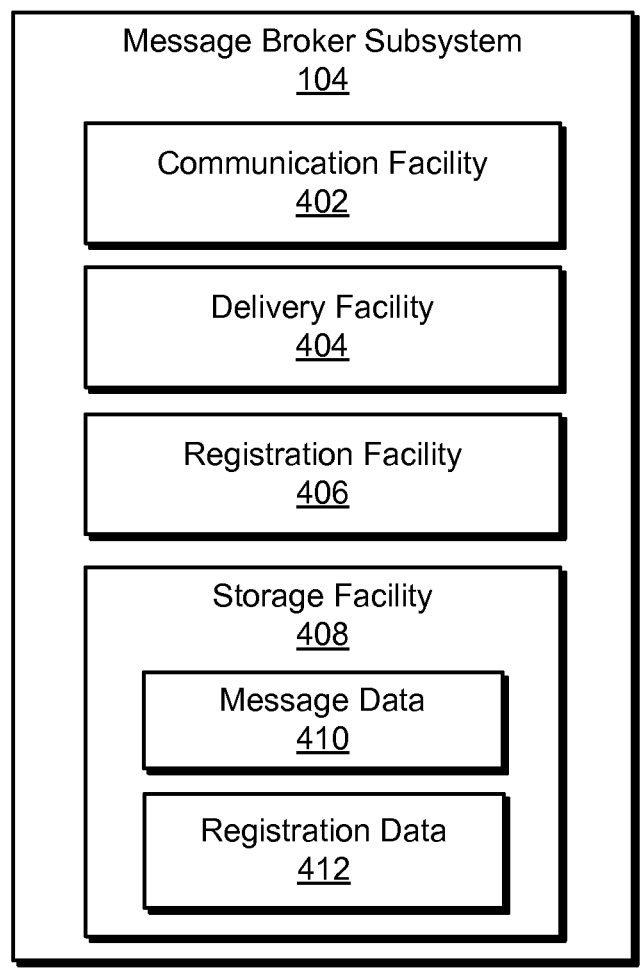
FIG. 4 illustrates exemplary components of a message broker subsystem according to principles disclosed herein.

FIG. 4 illustrates exemplary components of message broker subsystem 104. As shown in FIG. 4, message broker subsystem 104 may include a communication facility 402, a delivery facility 404, a registration facility 406, and a storage facility 408, which may be in communication with one another using any suitable communication technologies.

Communication facility 402 may be configured to facilitate communication between message broker subsystem 104 and software application subsystem 102. For example, communication facility 402 may be configured to establish and/or assist in establishing one or more connections between message broker subsystem 104 and software application subsystem 102 over which one or more messages may be transmitted from software application subsystem 102 to message broker subsystem 104 and/or from message broker subsystem 104 to software application subsystem 102. In some examples, communication facility 104 may be configured to receive a message intended for delivery to a recipient software application by way of one of the established one or more connections.

Communication facility 402 may additionally or alternatively be configured to facilitate communication between message broker subsystem 104 and global directory service subsystem 106. For example, communication facility 402 may be configured to transmit registration data associated with a particular software application and/or any other data to global directory service subsystem 106 as may serve a particular implementation.

Delivery facility 404 may be configured to deliver (and/or attempt to deliver) one or more messages received from one or more originating software applications to one or more recipient software applications in accordance with delivery instructions included within the message(s). To this end, delivery facility 404 may be configured to utilize one or more connections established by communication facility 402.

Registration facility 406 may be configured to register a software application with message broker subsystem 104. For example, communication facility 402 may receive a request from a software application to be temporarily registered with a message broker in accordance with a universal registration heuristic. Registration facility 406 may then authenticate the request in any suitable manner. For example, registration facility 406 may verify a correct name, user identification ("user ID"), and/or password included in the request received from the software application. In response to a successful authentication, registration facility 406 may transmit the name and/or user ID to global directory service subsystem 106 as part of a request for the software application to be temporarily registered with the message broker. As will be described in more detail below, global directory service subsystem 106 may analyze the name and/or user ID to determine whether the software application is authorized to be temporarily registered with the software application.

Registration facility 406 may be configured to facilitate any other type of registration of a software application with a message broker as may serve a particular implementation. For example, registration facility 406 may be configured to facilitate static registration of a software application with a message broker wherein the software application is always associated with the message broker.

Storage facility 408 may be configured to maintain message data 410 representative of one or more messages to be delivered to a recipient software application and registration data 412 representative of data utilized by registration facility 406. Storage facility 408 may maintain additional or alternative data as may serve a particular implementation.

Figure 5:
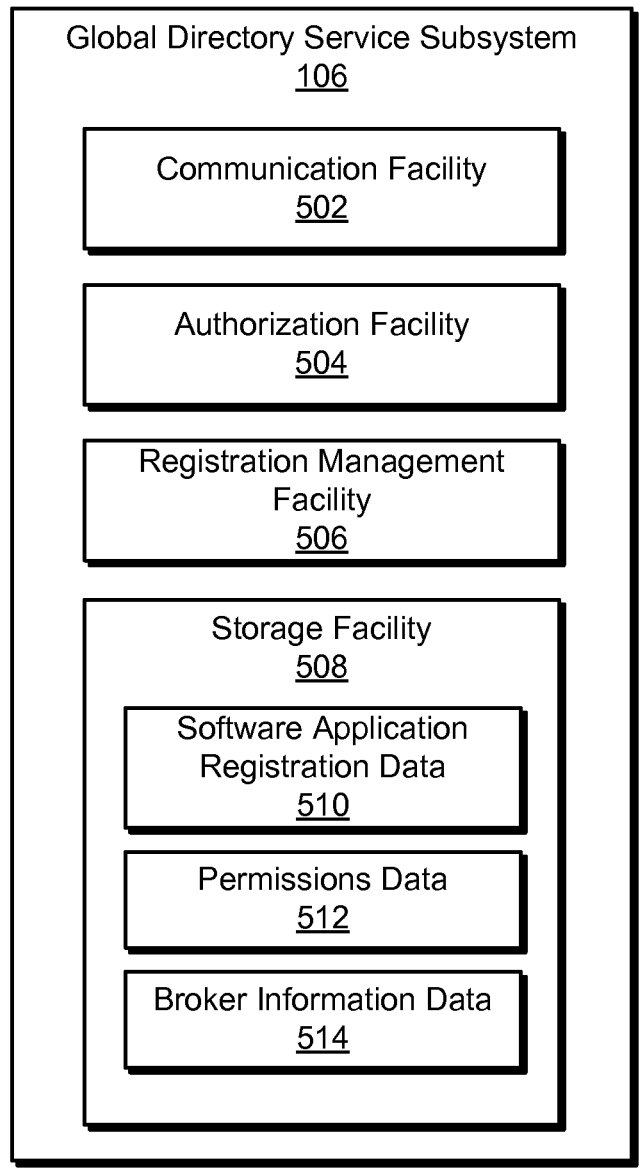
FIG. 5 illustrates exemplary components of a global directory service subsystem according to principles disclosed herein.

FIG. 5 illustrates exemplary components of global directory service subsystem 106. As shown in FIG. 5, global directory service subsystem 106 may include a communication facility 502, an authorization facility 504, a registration management facility 506, and a storage facility 508, which may be in communication with one another using any suitable communication technologies.

Communication facility 502 may be configured to facilitate communication between global directory service subsystem 106 and software application subsystem 102. Communication facility 502 may be further configured to facilitate communication between global directory service subsystem 106 and message broker subsystem 104. For example, communication facility 502 may receive a request from a message broker for a software application to be temporarily registered with the message broker in accordance with a universal registration heuristic. The request may include a name of the software application, a user ID associated with the software application, a name of the message broker, and/or any other information as may serve a particular implementation.

Authorization facility 504 may be configured to authorize a software application to be temporarily registered with a message broker in accordance with a universal registration heuristic. For example, in response to communication facility 502 receiving a request from a message broker for a software application to be temporarily registered with the message broker in accordance with a universal registration heuristic, authorization facility 504 may utilize permission information associated with the software application and managed by registration management facility 506 to determine whether the software application is authorized to be temporarily registered with the message broker. The permission information associated with the software application may indicate a current registration status of the software application (i.e., whether the software application is already registered with a message broker), a type of registration that the software application is authorized to employ (i.e., whether the software application has permission to employ universal registration), and/or any other information associated with the software application as may serve a particular implementation.

In some examples, authorization facility 504 may authorize the software application to be temporarily registered with the message broker by verifying that the name and/or user ID included in the request received by communication facility 502 are included in a list of names and/or user IDs associated with software applications that have permission to employ universal registration. The list may be managed by registration management facility 506 and may be input by personnel associated with system 100 and/or otherwise generated as may serve a particular implementation. Additionally or alternatively, authorization facility 504 may verify that the software application is not already registered with another message broker. Authorization facility 504 may be configured to perform any other authorization operation as may serve a particular implementation.

Registration management facility 506 may be configured to perform any registration management operation associated with one or more software applications and/or message brokers. For example, registration management facility 506 may be configured to maintain a software application registration table comprising software application registration data configured to indicate a current registration status of one or more software applications.

To illustrate, FIG. 6 shows an exemplary software application registration table 600 comprising software application registration data that may be maintained by global directory service subsystem 106. The software application registration data may be maintained in the form of a look-up table, in a database, and/or in any other manner as may serve a particular implementation.

As shown in FIG. 6, software application registration table 600 indicates a current registration type (e.g., static or temporary) of one or more software applications each currently associated with (e.g., connected to) one of a plurality of message brokers. In the example of FIG. 6, six software applications are each currently registered with one of four message brokers. Each software application has a unique name. For example, the first software application listed in table 600 is named "application 1," the second software application listed in table 600 is named "application 2," etc. Table 600 may further include the name of a message broker to which each of the software applications listed in table 600 is registered. For example, table 600 shows that the software application named "application 1" is registered with a message broker named "broker A", the software application named "application 2" is registered with message a message broker named "broker D", etc. The last column of table 600 shows the current registration type of the software applications included in table 600. For example, table 600 shows that the software application named "application 1" is statically registered with broker A, the software application named "application 2" is temporarily registered with broker D, etc.

In some examples, registration management facility 506 may dynamically update software application registration table 600 in response to authorization facility 504 authorizing a software application to be temporarily registered with a message broker. For example, registration management facility 506 may dynamically include an entry in software application registration table 600 that is configured to indicate that the software application is temporarily registered with the message broker.

Figure 7:
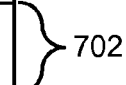
FIG. 7 shows the software application registration table of FIG. 6 after an entry has been added to indicate that a software application is temporarily registered with a message broker according to principles disclosed herein.

To illustrate, authorization facility 504 may authorize a software application named "application 7" to be temporarily registered with a message broker named "broker B" in accordance with a universal registration heuristic. In response, registration management facility 506 may dynamically include an entry configured to indicate that the software application named "application 7" is temporarily registered with broker B in software application registration table 600. FIG. 7 shows software application registration table 600 after such an entry (e.g., entry 702) has been added to table 600. In this manner, the registration data associated with the software application named "application 7" may be accessed and used by a message broker to appropriately route a message to the software application named "application 7."

Returning to FIG. 5, registration management facility 506 may be further configured to detect a disconnecting of a temporarily registered software application from a message broker. In response, registration management facility 506 may dynamically unregister the software application from the message broker. For example, registration management facility 506 may remove an entry corresponding to the software application from a software application registration table. In this manner, the software application registration table may no longer indicate that the software application is registered with the message broker.

In some examples, after a software application has been unregistered with a message broker, communication facility 502 may receive a request for the software application to be temporarily registered with another message broker in accordance with the universal registration heuristic. Authorization facility 504 may authorize the registration of the software application with the other message broker in a manner similar to that described above. Registration management facility 506 may dynamically update, in response to the authorization of the software application to be temporarily registered with the other message broker, the software application registration table to include an entry configured to indicate that the software application is temporarily registered with the other message broker. An example of such updating will be provided in more detail below.

After a software application has been unregistered from a message broker, registration management facility 506 may automatically notify one or more other message brokers that the software application has been unregistered from the message broker. These one or more other message brokers may include one or more message brokers that had obtained registration information associated with the software application prior to the software application being unregistered from the message broker.

For example, a first message broker may query global directory service subsystem 106 to obtain registration information associated with the software application (i.e., the name of a second message broker with which the software application is registered) in order to route a message to the software application. The first message broker may then store the registration information in a local cache to avoid having to query global directory service subsystem 106 for subsequent messages intended for the software application. When the software application becomes unregistered from the second message broker, registration management facility 506 may automatically notify the first message broker and direct the first message broker to update the stored registration information with information indicating that the software application has been unregistered from the second message broker. When the software application is re-registered with another message broker (e.g., a third message broker) at a later time, registration management facility 506 may again notify the first message broker that the software application has been re-registered with the other message broker. In this manner, the first message broker may appropriately route messages to the software application, regardless of the particular message broker with which the software application is registered.

In some examples, registration management facility 506 may detect a deactivation of a message broker to which a software application is currently registered. For example, registration management facility 506 may detect that the message broker has lost power, become unable to relay messages, and/or otherwise ceased being able to communicate. In response, registration management facility 506 may dynamically unregister the software application from the message broker. In this manner, the software application may be dynamically re-registered with another message broker that is currently active, thereby maintaining the ability of the software application to send and receive messages.

Registration management facility 506 may be additionally or alternatively configured to detect a deactivation of a message broker by detecting a failure by the message broker to transmit an active status notification to global directory service subsystem 106. The active status notification may include data representative of an active status of the message broker and may be transmitted by the message broker to global directory service subsystem 106 on a periodic basis. If registration management facility 506 fails to receive the active status notification during a predetermined amount of time, registration management facility 506 may determine that the message broker has become deactivated and dynamically unregister the software application from the message broker.

In some examples, a message broker may terminate abruptly and restart immediately thereafter. Registration management facility 506 may be configured to detect the abrupt termination and restarting of the message broker and, in response, dynamically unregister the software application from the message broker. Registration management facility 506 may detect the abrupt termination and restarting of the message broker by detecting a start time transmitted thereto by the message broker during a startup procedure and/or in any other manner as may serve a particular implementation.

In some examples, registration management facility 506 may be configured to maintain a permissions information table configured to indicate a list of software applications authorized to employ universal registration. To illustrate, FIG. 8 shows an exemplary permissions information table 800 that may be maintained by registration management facility 506. The permissions information may be maintained in the form of a lookup table, a database, and/or in any other manner as may serve a particular implementation and may be input by personnel associated with system 100 and/or any other manner as may serve a particular implementation.

As shown in FIG. 8, permissions information table 800 may include a list of names and/or user IDs of software applications authorized to employ universal registration. In the example of FIG. 8, software applications named "application 2" and "application 7" are authorized to employ universal registration. The user ID may include a unique identifier associated with each software application and may be used to prevent unauthorized impersonation of a software application and/or hijacking of the software application. It will be recognized, however, that permissions information table 800 may only include the name of each authorized software application in some examples. If a name and/or user ID of a software application is not listed in table 800, authorization facility 504 may prevent the software application from being temporarily registered with the message broker.

Returning to FIG. 5, storage facility 508 may be configured to maintain software application registration data 510 (e.g., information that may be included in software application registration table 600), permissions data 512 (e.g., information that may be included in permissions information table 800), broker information data 514 descriptive of or otherwise corresponding to one or more message brokers, and/or any other data as may serve a particular implementation.

Broker information data 514 may include information descriptive of or otherwise corresponding to message broker subsystem 104. For example, broker information data 514 may include a list of broker names and corresponding IP addresses and location port numbers. Broker information data 514 may be registered dynamically and/or statically as may serve a particular implementation.

Figure 9:
FIG. 9 shows an exemplary broker information table according to principles disclosed herein.

FIG. 9 shows an exemplary broker information table 600 comprising broker information data that may be maintained by global directory service subsystem 106. The broker information data may be maintained in the form of a look-up table, in a database, and/or in any other manner as may serve a particular implementation.

As shown in FIG. 9, broker information table 900 may include a list of broker names, location IP addresses, and location port numbers associated with each of a plurality of message brokers implementing message broker subsystem 104. The information included within broker information table 900 may be accessed by one or more message brokers and/or software applications to determine appropriate delivery instructions for messages to be transmitted from one software application to another.

In some examples, storage facility 508 may be implemented by a main storage device and one or more backup storage devices. Data maintained by storage facility 508 may be synchronized between the main storage device and the one or more backup storage devices. In this manner, global directory service subsystem 106 may use the one or more backup storage devices if the main storage device fails. Moreover, the data stored within the main storage device and/or the one or more backup storage devices may be accessed in the event of an abrupt termination and restarting of global directory service subsystem 106. In this manner, registration data associated with one or more software applications may be preserved.

In some examples, global directory service subsystem 106 is implemented by multiple global directory service servers. Each server may be located at a distinct location, for example. In some examples, the data maintained by each global directory service server may be synchronized so that each global directory service server always has current registration data associated with each software application and message broker that is a part of system 100.

Figure 10:
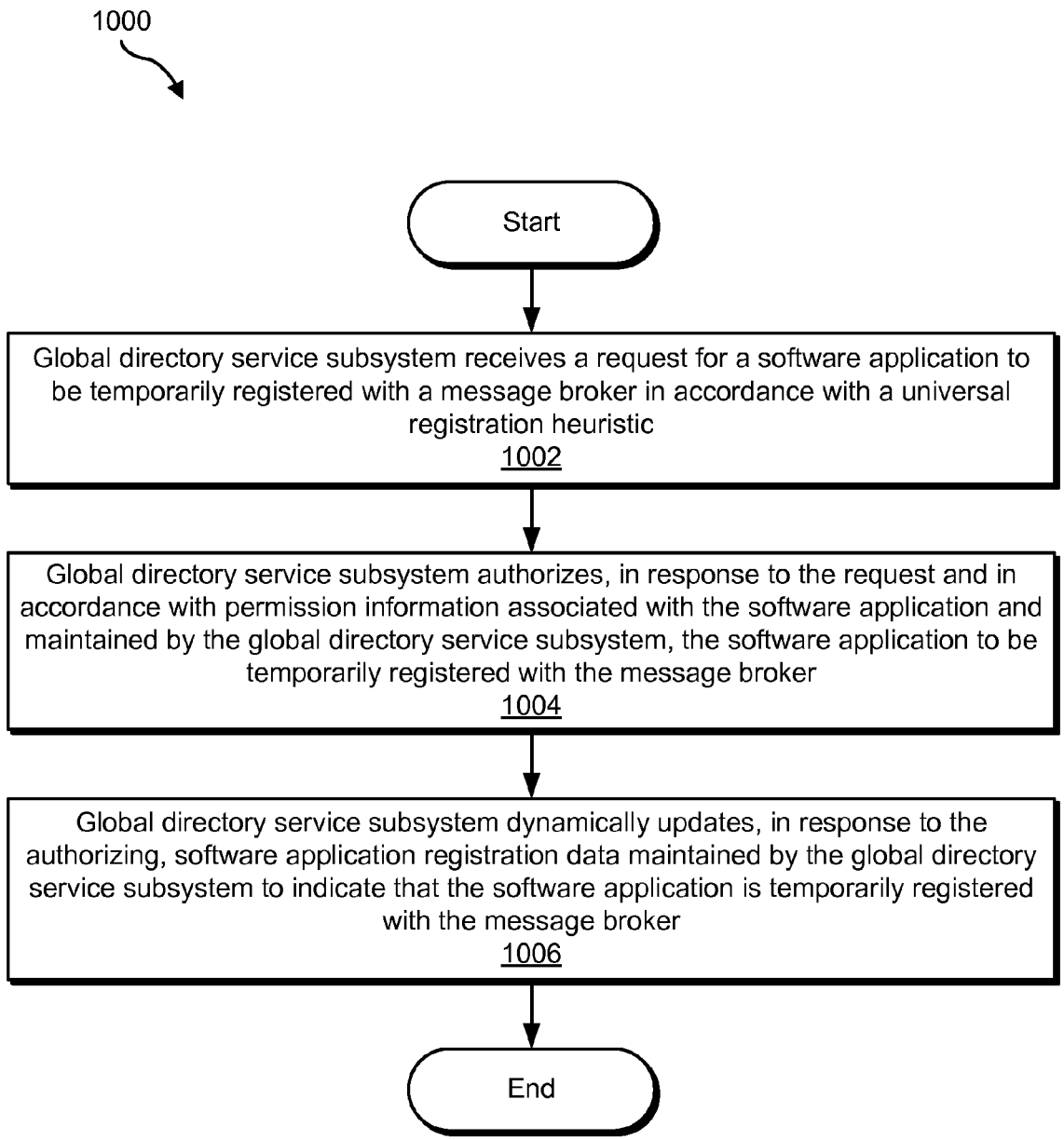
FIG. 10 illustrates an exemplary method of facilitating temporary registration of a software application with a message broker included in a broker-based messaging system according to principles disclosed herein.

FIG. 10 illustrates an exemplary method 1000 of facilitating temporary registration of a software application with a message broker included in a broker-based messaging system. While FIG. 10 illustrates exemplary steps according to one embodiment, other embodiments may omit, add to, reorder, and/or modify any of the steps shown in FIG. 10. One or more steps of method 1000 may be performed by global directory service subsystem 106 and/or any facility, component, or device thereof.

In step 1002, a global directory service subsystem receives a request for a software application to be temporarily registered with a message broker in accordance with a universal registration heuristic. The request may be received in any suitable manner as may serve a particular implementation.

In step 1004, a global directory service subsystem authorizes, in response to the request and in accordance with permission information associated with the software application and maintained by the global directory service subsystem, the software application to be temporarily registered with the message broker. Global directory service subsystem may perform the authorization in any of the ways described herein.

In step 1006, the global directory service subsystem dynamically updates, in response to the authorizing, software application registration data maintained by the global directory service subsystem to indicate that the software application is temporarily registered with the message broker. The global directory service subsystem may dynamically update the software application registration data in any of the ways described herein.

Specific implementations and examples of the universal registration systems and methods described herein will now be described in connection with FIGS. 11-16. It will be recognized that the implementations and examples described in connection with FIGS. 11-16 are merely illustrative of the many possible implementations and examples of the systems and methods described herein.

Figure 11:
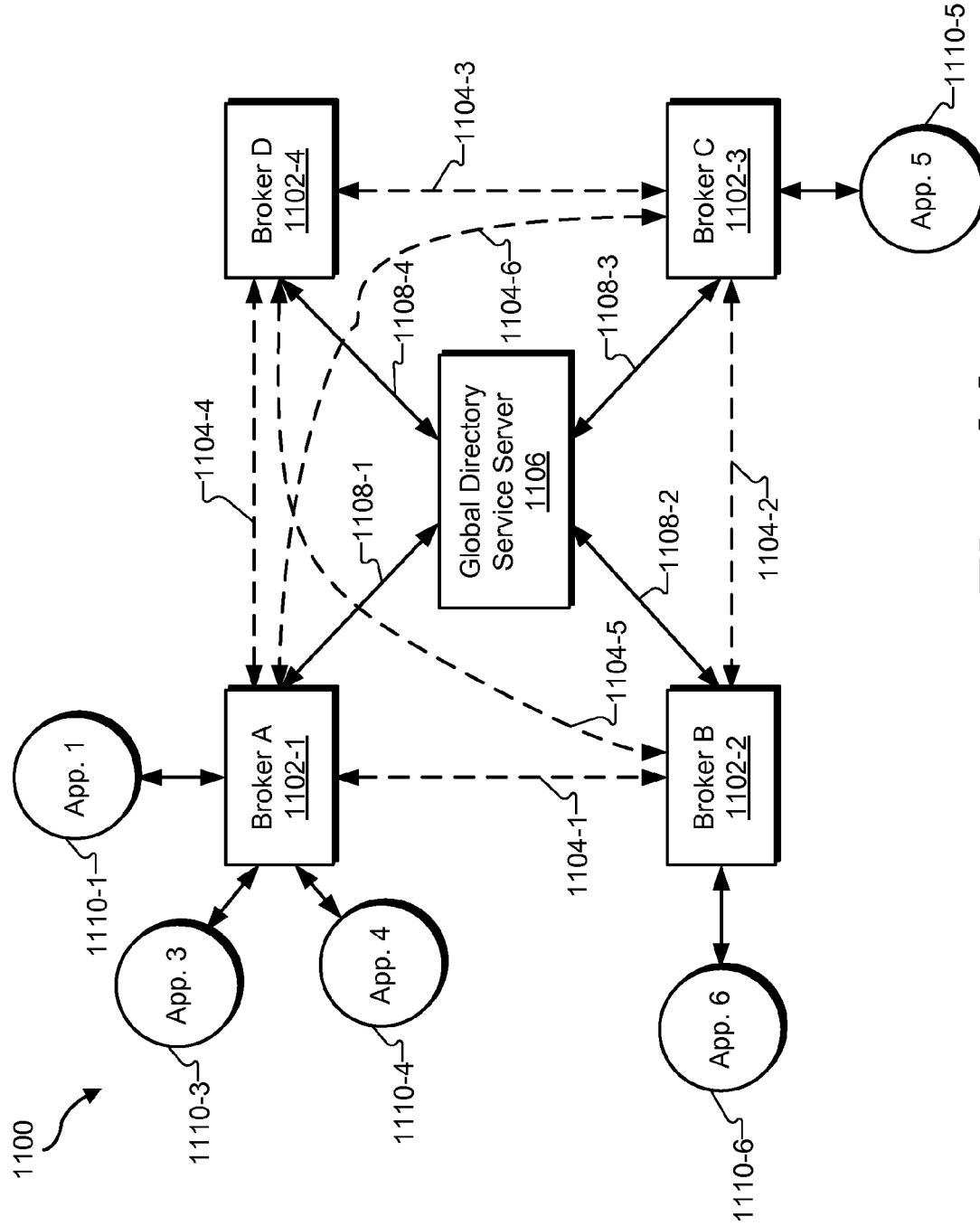

FIG. 11 illustrates an exemplary implementation 1100 wherein message broker subsystem 104 is implemented by multiple message brokers 1102 (e.g., a message broker 1102-1 named "broker A", a message broker 1102-2 named "broker B", a message broker 1102-3 named "broker C", and a message broker 1102-4 named "broker D") configured to communicate one with another by way of connections 1104 (e.g., connections 1104-1 through 1104-6). Each message broker 1102 may also be configured to communicate with a global directory service server 1106 by way of connections 1108 (e.g., connections 1108-1 through 1108-4). Global directory service subsystem 106 may be implemented by global directory service server 1106.

Each message broker 1102 may be associated with one or more software applications. For example, message broker 1102-1 is associated with a software application 1110-1 named "application 1", a software application 1110-3 named "application 3", and a software application 1110-4 named "application 4". Likewise, message broker 1102-2 is associated with a software application 1110-6 named "application 6" and message broker 1102-3 is associated with a software application 1110-5 named "application 5". In the example of FIG. 11, message broker 1102-4 is not associated with any software application.

FIG. 12 illustrates an exemplary software application registration table 1200 corresponding to implementation 1100 of FIG. 11 and that may be maintained by global directory service server 1106. As shown in FIG. 12, table 1200 indicates that software applications 1110-1, 1110-3, 1110-4, 1110-5, and 1110-6 are each statically registered with their associated message broker 1102. Hence, software applications 1110-1, 1110-3, 1110-4, 1110-5, and 1110-6 may transmit messages to each other as long as their associated message brokers 1102 remain active. For instance, software application 1110-1 may transmit a message to software application 1110-6 if both message brokers 1102-1 and 1102-2 are active. To transmit the message from software application 1110-1 to software application 1110-6, message broker 1102-1 may query global directory service server 1106 for registration data associated with software application 1110-6 and thereby determine that software application 1110-6 is statically registered with message broker 1102-2. Message broker 1102-1 may then route the message to software application 1110-6 by way of message broker 1102-2.

At some point in time, another software application named "application 2" may initiate a connection with message broker 1102-4 and transmit a message to message broker 1102-4 indicating that the software application intends to temporarily register with message broker 1102-4 in accordance with a universal registration heuristic. Message broker 1102-4 may authenticate the software application, as described above, and then transmit a request to global directory service server 1106 for the software application to be temporarily registered with message broker 1102-4 in accordance with a universal registration heuristic.

In response, global directory service server 1106 may verify that the software application is not already registered with another message broker. For example, global directory service server 1106 may search for the name of the software application (i.e., "application 2") in software application registration table 1200. If the name is found in software application registration table 1200, global directory service server 1106 may prevent the software application from being registered with message broker 1102-4.

Global directory service server 1106 may further verify that the software application is authorized to operate in accordance with a universal registration heuristic. For example, global directory service server 1106 may verify that the name (and, optionally, a user ID) of the software application are included in a permissions information table (e.g., permissions information table 800) maintained by global directory service server 1106.

After verifying that the software application is not already registered with another message broker and that the software application is included in the permissions information table, global directory service server 1106 may inform message broker 1102-4 that it may temporarily register the software application with message broker 1102-4.

Figure 13:
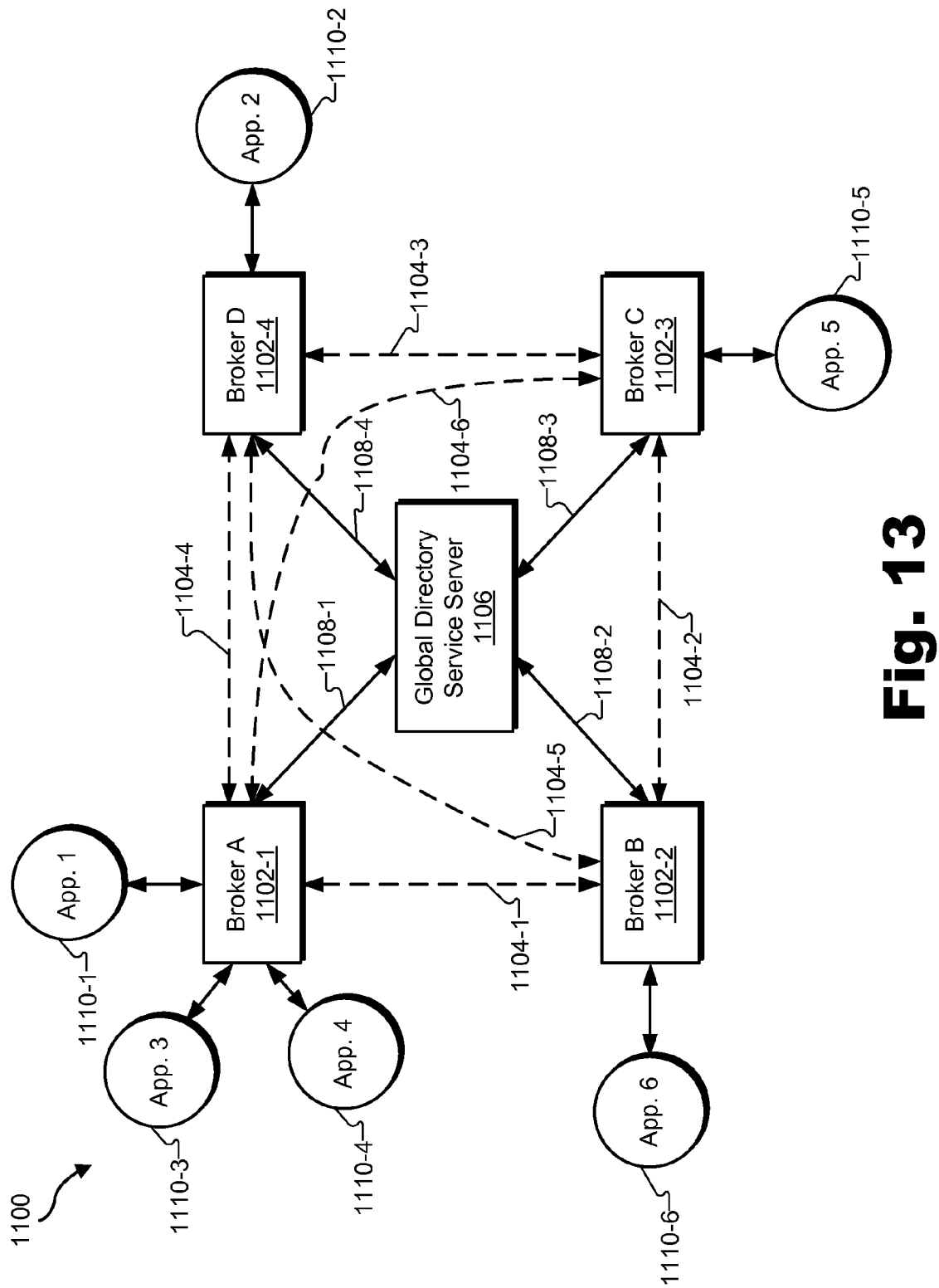

FIG. 13 shows implementation 1100 after the software application named "application 2" (i.e., software application 1110-2) has been temporarily registered with message broker 1102-4. As shown in FIG. 13, software application 1110-2 is connected to message broker 1102-4 and may therefore transmit and receive messages to and from the other software applications 1110 shown in FIG. 13.

Figure 14:

FIG. 14 shows software application registration table 1200 after software application 1110-2 has been authorized for temporary registration with message broker 1102-4. As shown in FIG. 14, in response to authorizing software application 1110-2 to be temporarily registered with message broker 1102-4, global directory service server 1106 may dynamically update software application registration table 1200 to include an entry 1402 configured to indicate that software application 1110-2 is temporarily registered with message broker 1102-4. As a result, message brokers 1102-1 through 1102-3 may query global directory service server 1106 to determine how and where to route messages intended for software application 1110-2.

In some examples, message broker 1102-4 may enter into an inactive state in which it is unable to communicate with other message brokers 1102 and/or global directory service server 1106. Global directory service server 1106 may detect the inactive state and unregister software application 1110-2 from message broker 1102-4 by removing entry 1402 from software application registration table 1200.

Figure 15:
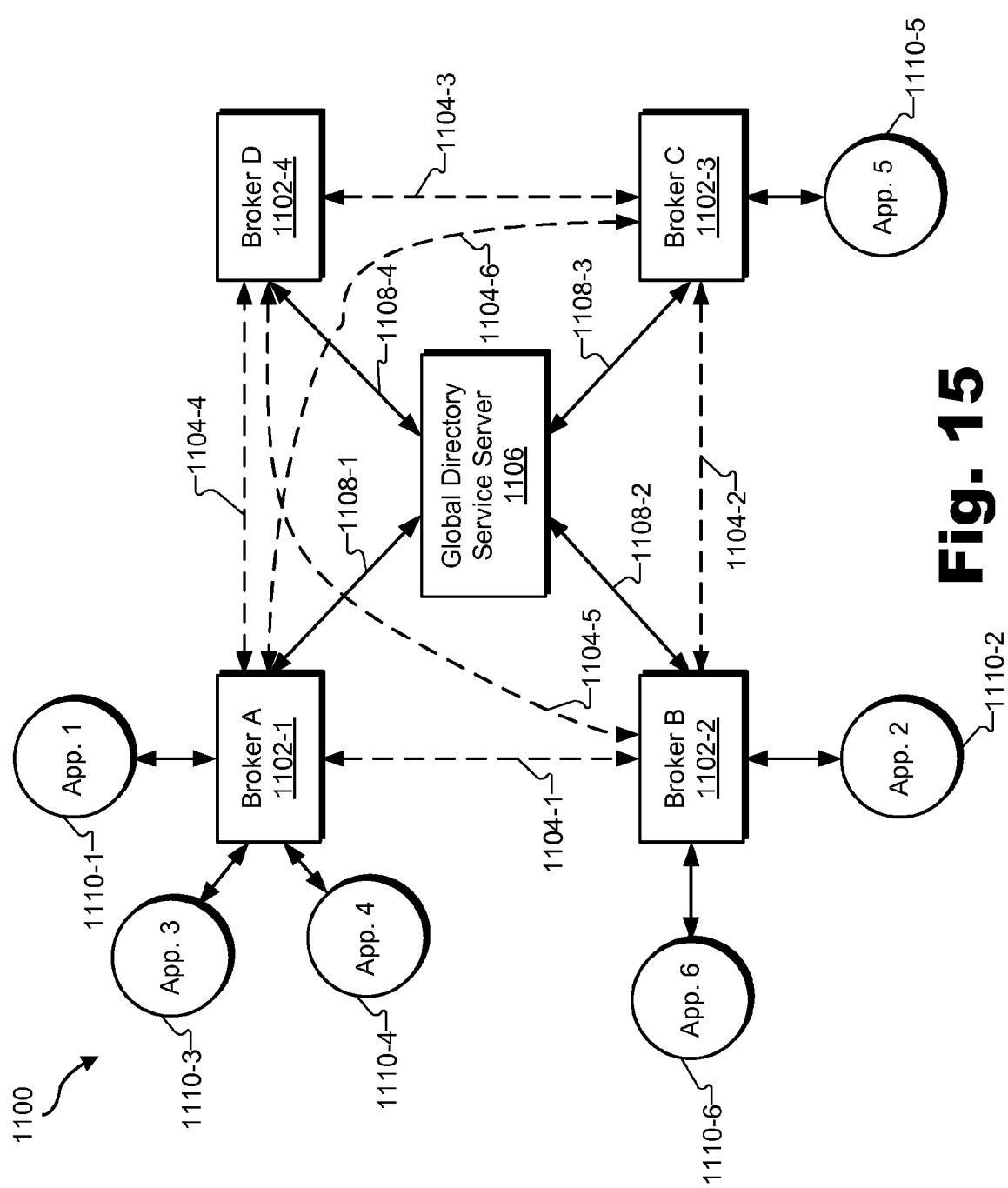
Figure 16:
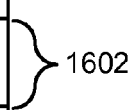

Because software application 1110-2 is authorized to employ universal registration, software application 1110-2 may subsequently register with another message broker 1102 using a similar process as that described above in connection with message broker 1102-4. For example, FIG. 15 shows that software application 1110-2 may establish a temporary registration with message broker 1102-2. FIG. 16 shows that after global directory service server 1106 authorizes the temporary registration of software application 1110-2 with message broker 1102-2, global directory service server 1106 may dynamically add an entry 1602 to software application registration table 1200 indicating that software application 1110-2 is now registered with message broker 1102-2.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on a non-transitory computer-readable medium configured to perform one or more of the processes described herein. In particular, system components may be implemented by one physical computing device or may be implemented by more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 17:
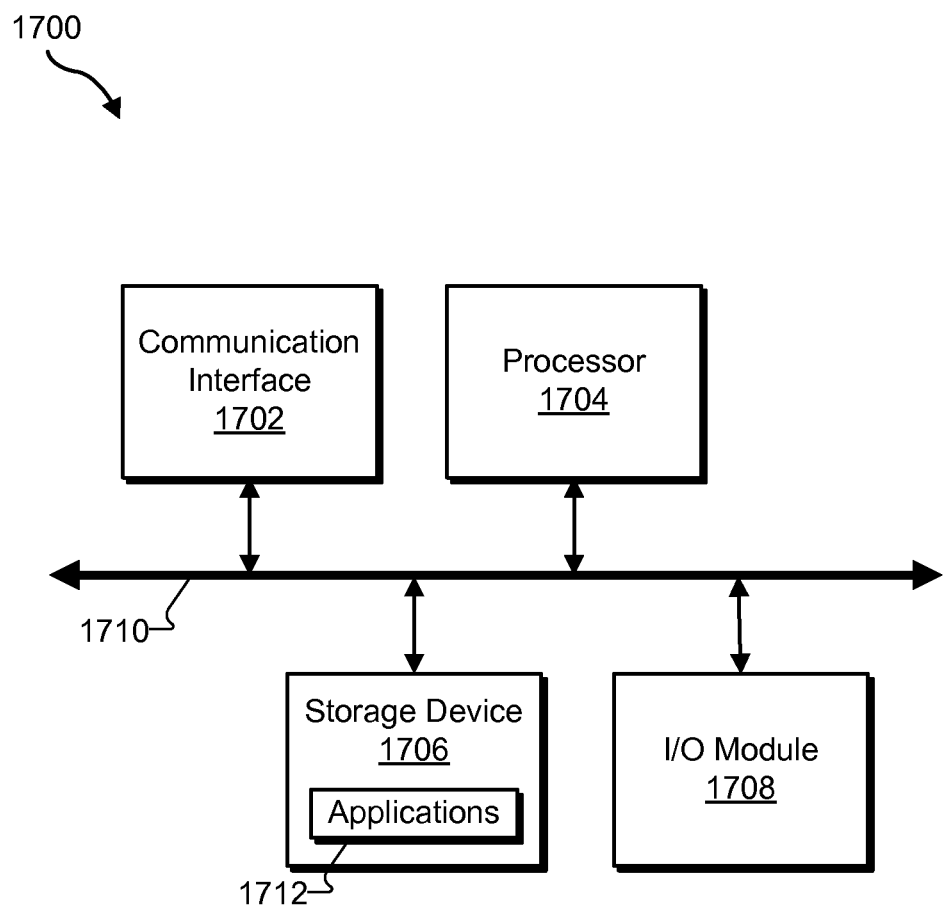
FIG. 17 illustrates an exemplary computing device according to principles disclosed herein.

FIG. 17 illustrates an exemplary computing device 1700 that may be configured to perform one or more of the processes described herein. As shown in FIG. 17, computing device 1700 may include a communication interface 1702, a processor 1704, a storage device 1706, and an input/output ("I/O") module 1708 communicatively connected via a communication infrastructure 1710. While an exemplary computing device 1700 is shown in FIG. 17, the components illustrated in FIG. 17 are not intended to be limiting. Additional or alternative components may be used in other embodiments. Components of computing device 1700 shown in FIG. 17 will now be described in additional detail.

Communication interface 1702 may be configured to communicate with one or more computing devices. Examples of communication interface 1702 include, without limitation, a wired network interface (such as a network interface card), a wireless network interface (such as a wireless network interface card), a modem, and any other suitable interface. Communication interface 1702 may additionally or alternatively provide such a connection through, for example, a local area network (such as an Ethernet network), a personal area network, a telephone or cable network, a satellite data connection, a dedicated URL, or any other suitable connection. Communication interface 1702 may be configured to interface with any suitable communication media, protocols, and formats, including any of those mentioned above.

Processor 1704 generally represents any type or form of processing unit capable of processing data or interpreting, executing, and/or directing execution of one or more of the instructions, processes, and/or operations described herein. Processor 1704 may direct execution of operations in accordance with one or more applications 1712 or other computer-executable instructions such as may be stored in storage device 1706 or another non-transitory computer-readable medium.

Storage device 1706 may include one or more data storage media, devices, or configurations and may employ any type, form, and combination of data storage media and/or device. For example, storage device 1706 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1706. For example, data representative of one or more executable applications 1712 (which may include, but are not limited to, one or more of the software applications described herein) configured to direct processor 1704 to perform any of the operations described herein may be stored within storage device 1706. In some examples, data may be arranged in one or more databases residing within storage device 1706.

I/O module 1708 may be configured to receive user input and provide user output and may include any hardware, firmware, software, or combination thereof supportive of input and output capabilities. For example, I/O module 1708 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1708 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 600. For example, one or more applications 1712 residing within storage device 1706 may be configured to direct processor 1704 to perform one or more processes or functions associated with communication facility 302, messaging facility 304, communication facility 402, delivery facility 404, registration facility 406, communication facility 502, authorization facility 504, and/or registration management facility 506. Likewise, storage facility 306, storage facility 408, and/or storage facility 508 may be implemented by or within storage device 1706.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by a global directory service subsystem, a request for a software application to be temporarily registered with a message broker included in a plurality of message brokers in accordance with a universal registration heuristic, the universal registration heuristic allowing the software application to directly access the message broker while the software application is temporarily registered with and connected to the message broker during a particular session, wherein the software application is configured to be able to be selectively and temporarily registered with any message broker included in the plurality of message brokers after the particular session terminates;

authorizing, by the global directory service subsystem in response to the request and in accordance with permission information associated with the software application and maintained by the global directory service subsystem, the software application to be temporarily registered with the message broker; and dynamically updating, by the global directory service subsystem in response to the authorizing, software application registration data maintained by the global directory service subsystem to indicate that the software application is temporarily registered with the message broker.

2. The method of claim 1, further comprising:
maintaining, by the global directory service subsystem, the software application registration data in a software application registration information table;
wherein the dynamically updating comprises adding an entry to the software application registration information table to indicate that the software application is temporarily registered with the message broker.

3. The method of claim 1, further comprising:
detecting, by the global directory service subsystem, a disconnecting of the software application from the message broker;
and dynamically unregistering, by the global directory service subsystem in response to the detecting, the software application from the message broker.

4. The method of claim 3, further comprising automatically notifying, by the global directory service subsystem in response to the dynamically unregistering, one or more other message brokers included in the plurality of message brokers that the software application has been unregistered from the message broker.

5. The method of claim 4, wherein the one or more other message brokers comprise one or more message brokers that had obtained registration information associated with the software application prior to the dynamically unregistering of the software application from the message broker and stored the registration information in one or more local caches associated with the one or more message brokers.

6. The method of claim 5, further comprising directing, by the global directory service subsystem, the one or more message brokers to update the stored with data indicating that the software application has been unregistered from the message broker.

7. The method of claim 3, further comprising:
receiving, by the global directory service subsystem after the software application is unregistered with the message broker, another request for the software application to be temporarily registered with another message broker included in the plurality of message brokers in accordance with the universal registration heuristic;
authorizing, by the global directory service subsystem in accordance with the permission information associated with the software application, the software application to be temporarily registered with the another message broker; and
dynamically updating, by the global directory service subsystem in response to the authorizing the software application to be temporarily registered with the another message broker, the software application registration data to indicate that the software application is temporarily registered with the another message broker.

8. The method of claim 7, further comprising automatically notifying, by the global directory service subsystem, one or more other message brokers included in the plurality of message brokers that the software application is temporarily registered with the another message broker.

9. The method of claim 3, further comprising:
maintaining, by the global directory service subsystem, the software application registration data in a software application registration information table;
and dynamically unregistering, by the global directory service subsystem, the software application from the message broker by removing the entry from the software application registration information table.

10. The method of claim 1, wherein the request comprises a name and a user identification associated with the software application, and wherein the authorizing comprises verifying that the name and the user identification are included in the permission information maintained by the global directory service subsystem.

11. The method of claim 1, wherein the authorizing comprises verifying that the software application has permission to employ the universal registration heuristic.

12. The method of claim 1, wherein the authorizing comprises verifying that the software application is not already registered with another message broker included in the plurality of message brokers.

13. The method of claim 1, further comprising:
detecting, by the global directory service subsystem, a deactivation of the message broker;
and dynamically unregistering, by the global directory service subsystem in response to the detecting, the software application from the message broker.

14. The method of claim 1, further comprising:
detecting, by the global directory service subsystem, a failure by the message broker to transmit an active status notification to the global directory service subsystem;
and dynamically unregistering, by the global directory service subsystem in response to the detecting, the software application from the message broker.

15. The method of claim 1, further comprising:
receiving, by the global directory service subsystem, another request for another software application to be temporarily registered with the message broker in accordance with the universal registration heuristic;
determining, by the global directory service subsystem, that the another software application is not authorized to be temporarily registered with the message broker;
and preventing, by the global directory service subsystem in response to the determining, the another software application from being temporarily registered with the message broker.

16. The method of claim 1, embodied as computer-executable instructions on at least one non-transitory computer-readable medium.

17. A system comprising:
at least one computing device, comprising:
a communication facility configured to receive a request for a software application to be temporarily registered with a message broker included in a plurality of message brokers in accordance with a universal registration heuristic, the universal registration heuristic allowing the software application to directly access the message broker while the software application is temporarily registered with and connected to the message broker during a particular session, wherein the software application is configured to be able to be selectively and temporarily registered with any message broker included in the plurality of message brokers after the particular session terminates;

an authorization facility communicatively coupled to the communication facility and configured to authorize, in response to the request and in accordance with permission information associated with the software application, the software application to be temporarily registered with the message broker; and a registration management facility communicatively coupled to the authorization facility and configured to dynamically update, in response to the authorization, software application registration data to indicate that the software application is temporarily registered with the message broker.

18. The system of claim 17, wherein the registration management facility is further configured to detect a disconnecting of the software application from the message broker, and dynamically unregister, in response to the detection, the software application from the message broker.

19. The system of claim 18, wherein the registration management facility is further configured to automatically notify, in response to the dynamic unregistration, one or more other message brokers included in the plurality of message brokers that the software application has been unregistered from the message broker.

20. A system comprising:
at least one computing device, comprising:
a message broker included in a plurality of message brokers;
and a global directory service subsystem selectively and communicatively coupled to the message broker;
wherein the message broker is configured to
receive a request from a software application for the software application to be temporarily registered with the message broker in accordance with a universal registration heuristic, the universal registration heuristic allowing the software application to directly access the message broker while the software application is temporarily registered with and connected to the message broker during a particular session, wherein the software application is configured to be able to be selectively and temporarily registered with any message broker included in a plurality of message brokers after the particular session terminates, and transmit, in response to the first request, a name and user identification associated with the software application to the global directory service subsystem;

and wherein the global directory service subsystem is configured to maintain permission information associated with the software application, determine that the name and the user identification are included in the permission information, verify that the software application is not already registered with another message broker included in the plurality of message brokers, and transmit authorization data to the message broker in accordance with the determination and the verification, the authorization data authorizing the software application to be registered with the message broker.

21. The system of claim 20, wherein the global directory service subsystem is further configured to
maintain a software application registration table, and
dynamically update the software application registration table to include an entry configured to indicate that the software application is temporarily registered with the message broker.

22. The system of claim 20, wherein the global directory service subsystem is further configured to detect a disconnecting of the software application from the message broker, and dynamically unregister, in response to the detection, the software application from the message broker.

23. The system of claim 22, wherein the global directory service subsystem is further configured to automatically notify, in response to the dynamic unregistration, one or more other message brokers included in the plurality of message brokers that the software application has been unregistered from the message broker.

* * * * *